United States Patent
Vijayakumari et al.

(10) Patent No.: US 10,696,549 B2
(45) Date of Patent: Jun. 30, 2020

(54) METHOD FOR PROCESSING A GAS MIXTURE

(71) Applicant: SHELL OIL COMPANY, Houston, TX (US)

(72) Inventors: Sivakumar Sadasivan Vijayakumari, Gonzales, LA (US); Parag Kotak, Amsterdam (NL); Arjan Allert Jonckers, Amsterdam (NL); Hubert Willem Schenck, Amsterdam (NL); Julie Hélène Emond Duncan, Amsterdam (NL); Eduardo Jorge Festa Pereira Ribeiro, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 381 days.

(21) Appl. No.: 15/318,987

(22) PCT Filed: Jun. 29, 2015

(86) PCT No.: PCT/EP2015/064699
§ 371 (c)(1),
(2) Date: Dec. 15, 2016

(87) PCT Pub. No.: WO2016/001139
PCT Pub. Date: Jan. 7, 2016

(65) Prior Publication Data
US 2017/0107102 A1 Apr. 20, 2017

Related U.S. Application Data

(60) Provisional application No. 62/019,018, filed on Jun. 30, 2014.

(30) Foreign Application Priority Data

Jul. 3, 2014 (EP) .................................... 14175647

(51) Int. Cl.
*C01B 3/12* (2006.01)
*B01D 53/047* (2006.01)

(52) U.S. Cl.
CPC .............. *C01B 3/12* (2013.01); *B01D 53/047* (2013.01); *B01D 2253/102* (2013.01);
(Continued)

(58) Field of Classification Search
CPC .. B01D 53/047; B01D 2253/102; C01B 3/12; Y02P 20/582
See application file for complete search history.

(56) References Cited

U.S. PATENT DOCUMENTS 3,919,114 A * 11/1975 Reynolds .................. C01B 3/16
252/373
4,259,091 A 3/1981 Benkmann
(Continued)

FOREIGN PATENT DOCUMENTS

FR 2909570 6/2008
FR 2979253 3/2013
(Continued)

OTHER PUBLICATIONS

SP0801—International Search Report for PCT/EP2015/064699 dated Sep. 15, 2015; 4 pages.
(Continued)

*Primary Examiner* — Paul A Wartalowicz

(57) ABSTRACT

The present invention relates to a process for processing a gas mixture comprising methane, carbon dioxide, carbon monoxide, hydrogen, nitrogen, argon and traces of olefins and oxygenates. Methane, carbon dioxide and carbon monoxide, and optionally hydrogen, can be recovered from the gas mixture in a very efficient way.

17 Claims, 3 Drawing Sheets

(52) U.S. Cl.
CPC .. *B01D 2253/104* (2013.01); *B01D 2253/106* (2013.01); *B01D 2253/108* (2013.01); *B01D 2256/16* (2013.01); *B01D 2256/22* (2013.01); *B01D 2256/245* (2013.01); *B01D 2257/102* (2013.01); *B01D 2257/11* (2013.01); *B01D 2257/502* (2013.01); *B01D 2257/504* (2013.01); *B01D 2257/7022* (2013.01); *B01D 2257/7025* (2013.01); *B01D 2259/402* (2013.01); *B01D 2259/4005* (2013.01); *B01D 2259/40032* (2013.01); *B01D 2259/4062* (2013.01); *C01B 2203/0283* (2013.01); *C01B 2203/043* (2013.01); *C01B 2203/0465* (2013.01); *C01B 2203/1205* (2013.01); *C01B 2203/146* (2013.01); *Y02C 10/08* (2013.01); *Y02C 20/20* (2013.01); *Y02P 20/582* (2015.11)

(56) References Cited

U.S. PATENT DOCUMENTS

| | | | |
|---|---|---|---|
| 5,096,470 A | 3/1992 | Krishnamurthy | |
| 5,669,960 A | 9/1997 | Couche | |
| 8,632,397 B2 | 1/2014 | Sommer et al. | |
| 8,632,697 B2 * | 1/2014 | Te Braake | B01D 53/04 252/373 |
| 8,956,441 B2 * | 2/2015 | Te Braake | B01D 53/04 95/97 |
| 8,956,641 B2 | 2/2015 | Zanella et al. | |
| 9,539,534 B2 * | 1/2017 | Sadasivan Vijayakumari | B01D 53/047 |
| 9,682,342 B2 * | 6/2017 | Sadasivan Vijayakumari | C01B 3/56 |
| 2003/0017373 A1 * | 1/2003 | Forte | C01B 3/34 429/420 |
| 2004/0077736 A1 | 4/2004 | Steynberg et al. | |
| 2008/0234397 A1 * | 9/2008 | Gimpel | C01B 3/382 518/700 |
| 2008/0300326 A1 | 12/2008 | Schneider et al. | |
| 2010/0288123 A1 | 11/2010 | Chen et al. | |
| 2011/0011128 A1 | 1/2011 | Grover | |
| 2013/0026418 A1 * | 1/2013 | Koseoglu | C01B 3/16 252/373 |
| 2013/0099167 A1 | 4/2013 | Te Braake et al. | |
| 2013/0276630 A1 | 10/2013 | Te Braake et al. | |

FOREIGN PATENT DOCUMENTS

| | | |
|---|---|---|
| WO | 9603345 | 2/1996 |
| WO | 2008006787 | 1/2008 |

OTHER PUBLICATIONS

Kuhre et al.; "Partial Oxidation Grows Stronger in US"; Oil & Gas Journal; vol. 69, No. 36; Sep. 6, 1971.

* cited by examiner

METHOD FOR PROCESSING A GAS MIXTURE

PRIORITY CLAIM

The present application is the National Stage (§ 371) of International Application No. PCT/EP2015/064699, filed Jun. 29, 2015, which claims priority from U.S. Provisional Application No. 62/019,018, filed Jun. 30, 2014, and European Application No. 14175647.8, filed Jul. 3, 2014, incorporated herein by reference.

FIELD OF THE INVENTION

The present invention relates to a process for processing a gas mixture comprising methane, carbon dioxide, carbon monoxide, hydrogen, nitrogen, argon and traces of olefins and oxygenates. Methane, carbon dioxide and carbon monoxide, and optionally hydrogen, can be recovered from the gas mixture in a very efficient way.

BACKGROUND OF THE INVENTION

The Fischer-Tropsch process can be used for the conversion of hydrocarbonaceous feed stocks into normally liquid and/or solid hydrocarbons (i.e. measured at 0° C., 1 bar). The feed stock (e.g. natural gas, associated gas, coal-bed methane, residual oil fractions, biomass and/or coal) is converted in a first step into a mixture of hydrogen and carbon monoxide. This mixture is often referred to as synthesis gas or syngas. The synthesis gas is fed into a reactor where it is converted over a suitable catalyst at elevated temperature and pressure into paraffinic compounds ranging from methane to high molecular weight molecules comprising up to 200 carbon atoms, or, under particular circumstances, even more.

The hydrocarbon products manufactured in the Fischer-Tropsch process are processed into different fractions, for example a liquid hydrocarbon stream comprising mainly $C_5+$ hydrocarbons, and a gaseous hydrocarbon stream which comprises methane, carbon dioxide, unconverted carbon monoxide, unconverted hydrogen, and lower hydrocarbons. The gaseous hydrocarbon stream may also comprise nitrogen and/or argon as the syngas sent to the Fischer-Tropsch reactor may contain some nitrogen and/or argon.

The gaseous hydrocarbon stream is often referred to as Fischer-Tropsch off-gas. Fischer-Tropsch off-gas can be recycled to the syngas manufacturing or to the Fischer-Tropsch reactor. Sometimes lower hydrocarbons are removed before the off-gas is recycled. Lower hydrocarbons may be removed by decreasing the temperature of the off-gas and then applying a gas-liquid separation. However, when the off-gas is recycled to the syngas manufacturing or to the Fischer-Tropsch reactor, the components in the off-gas which do not take part in the reactions, such as nitrogen and argon, occupy reactor space. The components which do not take part in the Fischer-Tropsch reaction are also referred to as "inerts".

The level of inerts in the Fischer-Tropsch reactor increases with increasing Fischer-Tropsch off-gas recycling. It is common to recycle only a relatively small part of the off-gas. One possibility is to recycle a part of the Fischer-Tropsch off-gas to one or more Fischer-Tropsch reactors and/or to the synthesis gas manufacturing unit, while another part of the off-gas is used as fuel. A downside of this is that only a part of the carbon atoms of the hydrocarbonaceous feed stock is converted to the desired $C_5+$ hydrocarbons. The pace of the build-up of inerts can be reduced by treating the off-gas before it is recycled.

Hydrogen is one of the most valued products. Rather than recovering carbon monoxide, a carbon monoxide shift reactor can be used to increase the hydrogen content of the off-gas.

US20110011128 describes a PSA comprising system in which purified hydrogen is produced using a PSA, which may be a conventional co-purge $H_2$ PSA unit. Such a system may be useful to a hydrogen-rich gas mixture exiting a steam methane reformer, but is not suitable to treat nitrogen comprising hydrogen-lean off-gas of a Fischer-Tropsch process.

US20040077736 mentions a process in which a liquid phase and a vapour phase are withdrawn from a hydrocarbons synthesis stage. In a vapour phase work-up stage, hydrocarbon products having 3 or more carbon atoms may be removed and the residual vapour phase may then pass to a PSA. Using the PSA first, second and optionally third gas components are separated. The first gas component comprises carbon monoxide and hydrogen. The second gas component comprises methane, and the optional third gas component comprises carbon dioxide. The first gas component is recycled to the hydrocarbon synthesis stage. US20040077736 does not provide details on the PSA method used. A regular use of a normal PSA would result in a relatively low recovery of carbon monoxide in the first gas component, and a build-up of nitrogen in the reactor upon recycling the first gas component to the hydrocarbon synthesis stage.

US20080300326-A1 describes the use of a PSA method to separate Fischer-Tropsch off-gas. The method produces at least one gas stream comprising hydrogen, at least one gas stream mainly comprising methane, and at least one gas stream comprising carbon dioxide, nitrogen and/or argon, and hydrocarbons with at least 2 carbon atoms. The PSA used comprises at least three adsorbent beds: alumina, carbon molecular sieves or silicates, activated carbon, and optionally zeolite. The alumina is used to remove water. The carbon molecular sieves or silicates are used to adsorb carbon dioxide and partially methane. The activated carbon is used to adsorb methane and partially nitrogen and carbon monoxide. Zeolite may be used to adsorb nitrogen, argon and carbon monoxide. The product stream of the PSA mainly comprises hydrogen. The other gas streams are obtained during the decompression phase. Disadvantages of the method of US20080300326-A1 are at least the following. Nitrogen is only partially adsorbed in the PSA. This results in a build-up of nitrogen in the Fischer-Tropsch reactor when the hydrogen stream is used, i.e. recycled, as reactant gas. Also the methane stream comprises nitrogen and thus results in the build-up of nitrogen in the syngas, and thus in the Fischer-Tropsch reactor, when the methane stream is used for generating syngas. Another disadvantage of the method of US20080300326-A1 is that carbon monoxide is only recycled to the Fischer-Tropsch reactor in a limited amount. Carbon monoxide is present in the hydrogen stream and in the methane stream.

There is a desire to recover both methane and hydrogen from gas mixtures such as Fischer-Tropsch off-gas in an efficient way. The methane and hydrogen could then, together or separately, be recycled to one or more units in a process line-up such as a Fischer-Tropsch line-up or to a methanol line-up. This would make it possible to convert most of the carbon atoms of the hydrocarbonaceous feed stock to the desired hydrocarbons. It is desired in some cases to additionally obtain a pure carbon dioxide stream from the gas mixture such as a Fischer-Tropsch off-gas, which may be recycled to the synthesis gas manufacturing unit or to a methanol manufacturing facility.

SUMMARY OF THE INVENTION

The invention provides a method for recovering hydrogen, methane and optionally carbon dioxide from a gas mixture comprising methane, carbon dioxide, carbon monoxide, hydrogen, nitrogen, argon and traces of olefins and oxygenates, said method comprising the following steps:

(1) feeding said gas mixture and an appropriate amount of steam through a high, medium or low temperature shift reactor(s) or a combination thereof to convert at least part of the carbon monoxide and water into hydrogen and carbon dioxide, to obtain an effluent;

(2) Optionally, removing bulk water from the effluent obtained in step 1;

(3) feeding the effluent of step (1) or (2) through a column comprising an adsorbent bed, wherein the adsorbent bed comprises alumina, a carbon molecular sieve, silicalite, activated carbon, a zeolite, or mixtures thereof, with upon commencement of said feeding, the bed and column being pre-saturated and pre-pressurized to a pressure in the range of 10 to 80 bar absolute (bar a), preferably 20 to 70 bar a, with a hydrogen gas preferably comprising 80 to 99.9 volume % hydrogen, or with a mixture of hydrogen, nitrogen and/or argon, and discharging a second effluent from the other end of said bed, and;

continuing said feeding and said discharging until a front of carbon monoxide comprising gas has reached at least 45% of the length of the bed, preferably at least 50%, more preferably at least 60%, and has reached at most 80% of the length of the bed, preferably at most 70%, calculated from the end of the bed at which the effluent is being fed; and (4) ceasing the feeding of the effluent and reducing the pressure in the column and the bed by about 5 to 25 bar a; and (5) further reducing the pressure of the column and adsorbent bed to a pressure in the range of 5 to 25 bar a to obtain a fourth effluent;

(6) further reducing the pressure of the column and adsorbent bed to a pressure in the range of 1 to 5 bar a; and (7) rinsing the column and adsorbent bed by feeding a mixture of hydrogen, nitrogen and/or argon through the column and adsorbent bed the column and bed being at a pressure in the range of 1 to 5 bar a; and (8) pressurizing the column and adsorbent bed to a pressure in the range of 15 to 75 bar a, preferably 25 to 65 bar a, more preferably 30 to 55 bar a by feeding a mixture of hydrogen, nitrogen and/or argon.

An advantage of the present invention is that in step 5 an effluent can be obtained which is a carbon rich gas or gas mixture. This effluent (fourth effluent) typically comprises methane and/or carbon dioxide and is mostly free of inerts. This gas can be obtained at elevated pressure. When the gas comprising methane and/or carbon dioxide is recovered at a elevated pressure it can be fed to a syngas manufacturing unit with minimum recompression required. No or a very low buildup of inerts will occur due to the recovered carbon rich stream being mostly free of inerts.

The process of the present invention provides for the conversion of carbon atoms of the hydrocarbonaceous feed stock to the desired $C_5+$ hydrocarbons.

An advantage of the present invention is that the carbon rich stream may be sent to a methanol synthesis unit to adjust the stoichiometric ratio for the formation of methanol (also referred to as the module M) as it contains low concentration of inerts.

An advantage of the present invention is the production of hydrogen.

The process of the present invention provides for improved conversion of carbon atoms of the hydrocarbonaceous feed stock to the desired $C_5+$ hydrocarbons.

The invention is further illustrated in the accompanying drawings.

DRAWINGS

DETAILED DESCRIPTION OF THE INVENTION

Figure 1:
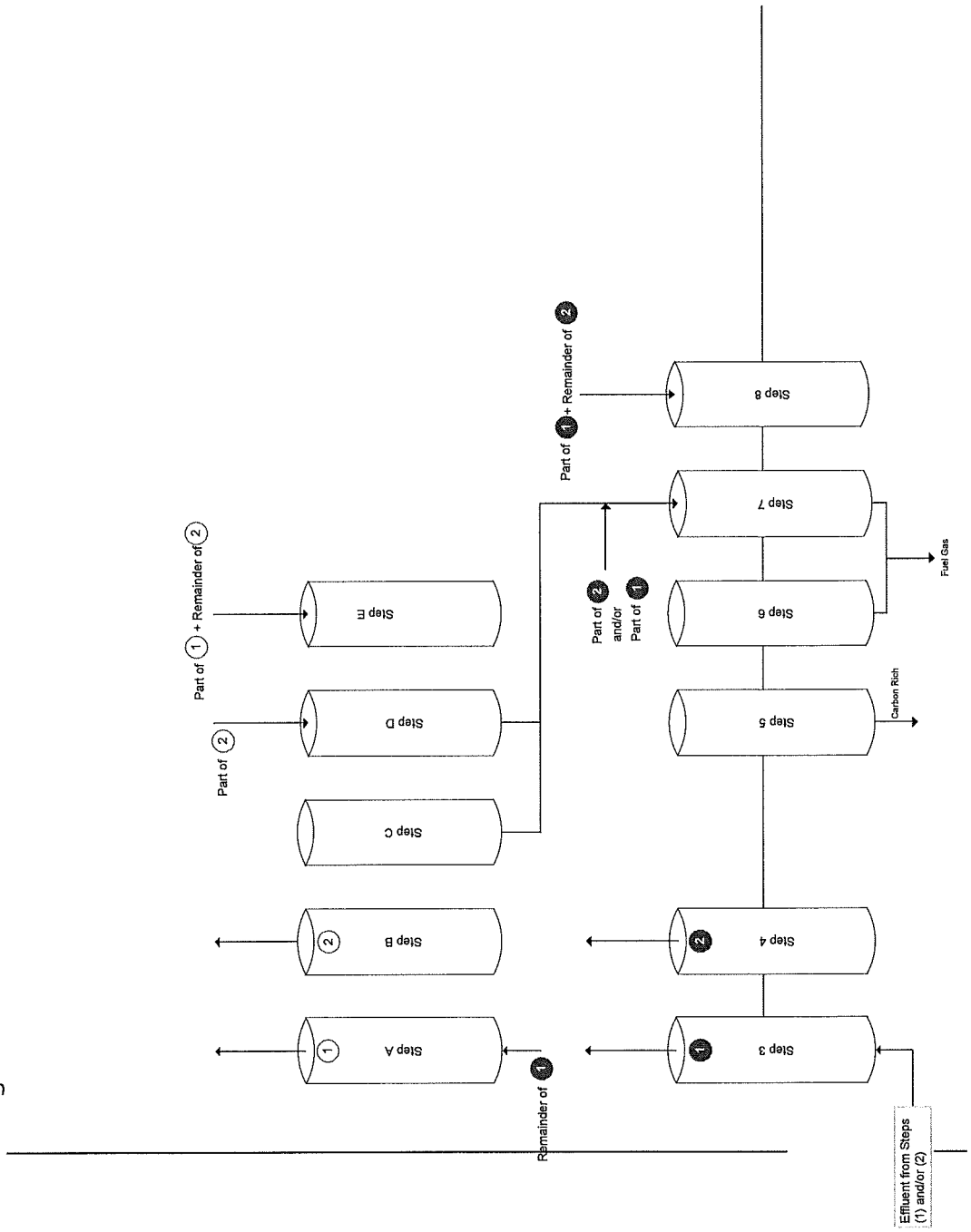
FIG. 1 shows an overview of the process steps of a preferred method according to the invention.

The present invention relates to processing of off-gas either directly obtained from a synthesis gas manufacturer such as a gasifier or from a Fischer-Tropsch reactor in order to convert most of the carbon atoms of the hydrocarbonaceous feed stock to the desired $C_5+$ hydrocarbons. When removed from a Fischer-Tropsch reactor, the Fischer-Tropsch off-gas is generally at a temperature in the range of 40-100° C., preferably in the range of 50-70° C. and at a pressure of 20-80 bar, preferably in the range of 50-70 bar.

Fischer-Tropsch off-gas is typically produced by a Fischer-Tropsch hydrocarbon synthesis process comprising the steps of:

i) conversion of a (preferably gaseous) hydrocarbonaceous feed to obtain synthesis gas (syngas);

ii) catalytic conversion of the synthesis gas obtained in step i) using a Fischer-Tropsch catalyst into a Fischer-Tropsch product; and iii) separating the Fischer-Tropsch product of step ii) into at least one hydrocarbon product stream and a Fischer-Tropsch off-gas.

Suitably, syngas production methods include steam reforming of natural gas or liquid hydrocarbons and gasification of coal. Some of the methods to convert (gaseous) hydrocarbonaceous feed into syngas include adiabatic oxidative reforming, autothermal reforming and partial oxidation. Preferably, hydrocarbonaceous feed is converted to syngas by partial oxidation at elevated temperature and pressure using an oxygen containing gas. Partial oxidation can take place according to various established processes. Catalytic as well as non-catalytic processes may be used. These processes include the Shell Gasification Process. A comprehensive survey of this process can be found in the Oil and Gas Journal, Sep. 6, 1971, pp 86-90.

The $H_2/CO$ ratio of the syngas is suitably between 1.5 and 2.3, preferably between 1.8 and 2.1 for Fischer-Tropsch processing. The catalysts used for the catalytic conversion of the mixture comprising hydrogen and carbon monoxide into hydrocarbons are known in the art and are usually referred to as Fischer-Tropsch catalysts. Preferably, the catalysts for use in the Fischer-Tropsch hydrocarbon synthesis process comprise as the catalytically active component cobalt. The catalytically active component is preferably supported on a porous carrier, e.g. silica or titania. If desired, the Fischer-Tropsch catalyst may also comprise one or more metals or metal oxides as promoters. Typically, the catalytic conversion may be effected at a temperature in the range of 150 to 350° C., preferably from 180 to 270° C. Typical total pressures for the catalytic conversion process are in the range of from 1 to 200 bar absolute, more preferably from 10 to 70 bar absolute.

Generally, the Fischer-Tropsch hydrocarbon product stream is separated from the Fischer-Tropsch off-gas by a gas/liquid separator.

The Fischer-Tropsch off-gas may comprise gaseous hydrocarbons, nitrogen, argon, methane, unconverted carbon monoxide, carbon dioxide, unconverted hydrogen and water. The gaseous hydrocarbons are suitably $C_1$-$C_5$ hydrocarbons, preferably $C_1$-$C_4$ hydrocarbons, more preferably $C_1$-$C_3$ hydrocarbons. These hydrocarbons, or mixtures thereof, are gaseous at temperatures of 5-30° C. (1 bar), especially at 20° C. (1 bar). Further, oxygenated compounds, e.g. methanol, dimethylether, may be present.

Fischer-Tropsh off-gas may contain 10-40 vol % hydrogen, preferably 15-35 vol % hydrogen, 20-65 vol % CO, preferably 30-55 vol % CO, 10-50 vol % CO2, preferably 15-45 vol % CO2, 1-55 vol % N2, preferably 2-50 vol % N2 and 0.1-55 vol % argon, preferably 0.1 to 45 vol % argon, calculated on the total volume of the dry gas mixture, preferably 10-40 vol % hydrogen, preferably 15-35 vol % hydrogen, 20-65 vol % CO, preferably 30-55 vol % CO, 10-50 vol % $CO_2$, preferably 15-45 vol % $CO_2$, 10-55 vol % $N_2$, preferably 15-50 vol % $N_2$ and 1-45 vol % argon, calculated on the total volume of the dry gas mixture. Depending on the syngas feed and the Fischer-Tropsch conditions the composition of the Fischer-Tropsch off-gas can vary. Obviously, the total volume of the gas mixture is 100 vol %.

In the gas to methanol (GTM) process natural gas, coal etc. is converted to synthesis gas. Synthesis gas can be obtained in a similar way as for the Fischer-Tropsch reaction as described previously. However synthesis gas can also be obtained by the use of a steam methane reformer (SMR) and/or auto-thermal reformer (ATR). The syngas is, where required after treatment, converted into methanol in a methanol synthesis reaction. The formation of methanol is defined by a module (M), a stoichiometric ratio defined as ($H_2$—$CO_2$)/(CO+$CO_2$) and usually set at 2. Depending on the synthesis gas manufacturing process, different modules will be obtained. Hydrogen or a carbon rich stream can be used to adjust such stoichiometric ratio to accommodate the methanol synthesis. The last section of a methanol production facility is the purification of methanol.

The invention provides a method for recovering hydrogen, methane and optionally carbon dioxide from a gas mixture comprising methane, carbon dioxide, carbon monoxide, hydrogen, nitrogen, argon and traces of olefins and oxygenates, said method comprising, the following steps:

(1) feeding said gas mixture and an appropriate amount of steam through a high, medium or low temperature shift reactor(s) or a combination thereof to convert at least part of the carbon monoxide and water into hydrogen and carbon dioxide, to obtain an effluent;
(2) Optionally, removing bulk water from the effluent obtained in step 1;
(3) feeding the effluent of step (1) or (2) through a column comprising an adsorbent bed, wherein the adsorbent bed comprises alumina, a carbon molecular sieve, silicalite, activated carbon, a zeolite, or mixtures thereof,
with upon commencement of said feeding, the bed and column being pre-saturated and pre-pressurized to a pressure in the range of 10 to 80 bar absolute (bar a), preferably 20 to 70 bar a, with hydrogen, preferably pure hydrogen containing more than 80 volume % hydrogen, more preferably containing 80 to 99.9 volume % hydrogen, or with a mixture of hydrogen, nitrogen and/or argon, and
discharging a second effluent from the other end of said bed, and;
continuing said feeding and said discharging until a front of carbon monoxide comprising gas has reached at least 45% of the length of the bed, preferably at least 50%, more preferably at least 60%, and has reached at most 80% of the length of the bed, preferably at most 70%, calculated from the end of the bed at which the gas mixture is being fed; and
(4) ceasing the feeding of the effluent and reducing the pressure in the column and the bed by about 5 to 25 bar a; and
(5) further reducing the pressure of the column and adsorbent bed to a pressure in the range of 5 to 25 bar a to obtain a fourth effluent;
(6) further reducing the pressure of the column and adsorbent bed to a pressure in the range of 1 to 5 bar a; and
(7) rinsing the column and adsorbent bed by feeding a mixture of hydrogen, nitrogen and/or argon through the column and adsorbent bed
the column and bed being at a pressure in the range of 1 to 5 bar a; and
(8) pressurizing the column and adsorbent bed to a pressure in the range of 15 to 75 bar a, preferably 25 to 65 bar a, more preferably 30 to 55 bar a by feeding a mixture of hydrogen, nitrogen and/or argon.

One advantage of the present invention is that the method is suitable to obtain a carbon rich stream comprising methane and optionally carbon dioxide from a gas mixture comprising methane, carbon dioxide, carbon monoxide, hydrogen, nitrogen, argon and traces of olefins and oxygenates, such as a Fischer-Tropsch off-gas. This carbon rich stream is recovered at elevated pressure and can be fed with minimal recompression to the Fischer-Tropsch reactor, to a syngas manufacturing facility or to a methanol process line-up.

The process is also suitable to recover unconverted hydrogen in an efficient way from the off-gas. The recovered hydrogen may be recycled to a Fischer-Tropsch reactor, to a methanol process line-up or to other processing unit(s).

When applied in a Fischer-Tropsch line-up, the process of the present invention makes it possible to convert most of the carbon atoms of the hydrocarbonaceous feed stock to the desired $C_5$+ hydrocarbons. This is achieved by recycling a carbon rich stream obtained according to the present invention to upstream of the syngas producing unit.

The gas mixture preferably comprises 1-50 vol % methane, 10-40 vol % carbon dioxide, 20-65 vol % carbon monoxide, 10-80 vol % hydrogen and 1-55 vol % nitrogen, preferably 10 to 55 vol % nitrogen, 0.1-55 vol % argon and optionally trace amounts of olefins and oxygenates, calculated on the total volume of the dry gas mixture, preferably said gas mixture is a gaseous product from a Fischer-Tropsch reaction (referred to as Fischer-Tropsch off-gas) and/or asynthesis manufacturing unit.

Fischer-Tropsch off-gas is typically produced by a Fischer-Tropsch hydrocarbon synthesis process comprising the steps of:

i) conversion of a (gaseous) hydrocarbonaceous feed to obtain synthesis gas (syngas);
ii) catalytic conversion of the synthesis gas obtained in step i) using a Fischer-Tropsch catalyst into a Fischer-Tropsch product; and
iii) separating the Fischer-Tropsch product of step ii) into at least one hydrocarbon product stream and a Fischer-Tropsch off-gas.

The off-gas obtained in step iii) may comprise gaseous hydrocarbons, nitrogen, argon, methane, unconverted carbon monoxide, carbon dioxide, unconverted hydrogen and water. The gaseous hydrocarbons are suitably $C_1$-$C_5$ hydrocarbons, preferably $C_1$-$C_4$ hydrocarbons, more preferably $C_1$-$C_3$ hydrocarbons. These hydrocarbons, or mixtures thereof, are gaseous at temperatures of 5-30° C. (1 bar), especially at 20° C. (1 bar). Further, oxygenated compounds, e.g. methanol, dimethylether, may be present. The gas mixture preferably comprises less than 10 volume %, more preferably less than 5 volume %, of hydrocarbons having 6 or more carbon atoms. More preferably the gas mixture comprises less than 10 volume %, more preferably less than 5 volume %, of hydrocarbons having 5 or more carbon atoms. Even more preferably the gas mixture comprises less than 10 volume %, more preferably less than 5 volume %, of hydrocarbons having 4 or more carbon atoms. In one embodiment hydrocarbons having 3 or more carbon atoms are removed from a Fischer-Tropsch off-gas, for example using a scrubber, before it is subjected to the method of the present invention. In a preferred embodiment ethane is present in an amount of less than 5 wt %, more preferably less than 2 wt %, and even more preferably less than 1 wt %, calculated on the total weight of the gas mixture.

Said gas mixture and an appropriate amount of steam are fed through one or more high, medium or low temperature shift reactor(s) or a combination thereof to convert at least part of the carbon monoxide and water into hydrogen and carbon dioxide, to obtain an effluent. In case required bulk water can be removed from the effluent obtained.

In an embodiment of the present invention the effluent obtained in step 1 and or 2 comprises:
0.1-40 vol % methane;
0.1-55 vol % and preferably 0.1-50 vol % carbon dioxide;
0.1-40 vol % carbon monoxide;
15-95 vol % hydrogen;
0.1-55 vol % nitrogen;
0.1-55 vol % argon;
and optionally trace amounts of olefins and oxygenates, calculated on the total volume of the dry gas mixture.

In a preferred embodiment of the present invention repeated cycles of steps (3) to (8) are performed. Effluent from one step can be used as feeding gas in another step; this is especially advantageous when repeated cycles of steps (3) to (8) are performed.

The method may be performed using a single column comprising an adsorbent bed. Preferably several columns that comprise an adsorbent bed are used. When using more than one column, the columns are preferably connected in parallel. Preferably the repeated cycles of steps (3) to (8) are performed over each column. In a preferred embodiment at least one column is subjected to one step of the cycle while another column is subjected to another step of the cycle. The product of one column can be used in another column, for example for purge, pressurization or rinse. In one embodiment at least two columns comprising an adsorbent bed, preferably at least six columns comprising an adsorbent bed, are subjected to repeated cycles of steps (3) to (8). Preferably at most 21, more preferably at most 16, and more preferably at the most 10 columns comprising an adsorbent bed are subjected to repeated cycles of steps (3) to (8).

For steps (3) to (8), the column comprising an adsorbent bed may be made of metal, preferably stainless steel. The adsorbent bed for steps (3) to (8) comprises alumina, a carbon molecular sieve, silicalite, activated carbon, a zeolite, or mixtures thereof. Preferably the adsorbent bed comprises activated carbon and/or zeolite. In another preferred embodiment the adsorbent bed comprises activated carbon and/or silicalite. When alumina is used, it is preferably combined with a carbon molecular sieve, activated carbon silicalite and/or zeolite. If zeolite is used, it may for example be ZSM-5A and/or ZSM-13 X. If silicalite is used, preferably a silicalite with a high silica to alumina molar ratio (SAR) is used. Activated carbon, silicalite and zeolite hardly adsorb nitrogen and hydrogen, but do adsorb carbon monoxide, methane, and carbon dioxide. Activated carbon, silicalite and zeolite are preferential adsorbents for methane and carbon dioxide as compared to carbon monoxide.

The absorbent bed and column are preferably pre-saturated and pre-pressurized with hydrogen or with a mixture of hydrogen, nitrogen and/or argon upon commencement of feeding of the effluent in step (3). The bed and column may be pressurized with pure hydrogen. Pure hydrogen comprises preferably more than 80 volume %, preferably more than 95 vol %, and more preferably more than 99.9 vol % of hydrogen. The bed and column may be pressurized with a mixture of hydrogen, nitrogen and/or argon. The mixture of hydrogen, nitrogen and/or argon preferably comprises hydrogen in a range of between 60 to 95 vol %, and nitrogen and/or argon in a range of between 5 to 40 vol %. The mixture of hydrogen, nitrogen and/or argon preferably comprises less than 10 vol %, more preferably less than 5 vol %, even more preferably less than 1 vol % of gasses other than hydrogen, nitrogen and/or argon. For example, the bed and column may be pressurized with a product hydrogen, nitrogen and/or argon comprising gas from step (3) of an earlier cycle.

In step (3), the effluent obtained in step (1) and/or (2) is fed to one end of the adsorbent bed, and a second effluent is discharged from the other end of the adsorbent bed. The adsorbent bed will adsorb methane and other hydrocarbons, carbon dioxide, nitrogen and carbon monoxide. The effluent obtained in step 3 will mainly comprise hydrogen, nitrogen and/or argon. A part of this effluent can be used to pressurize a column and absorbent bed at the start of a cycle or in step (8). Another part of this effluent can be used in rinsing step (7). The pressure of the effluent gas will be about the same as the pressure in the column and the adsorbent bed and will thus be in the range of 10 to 80 bar absolute (bar a), preferably 20 to 70 bar a.

The feeding of the effluent and the discharging of the second effluent are continued until a front of carbon monoxide comprising gas has reached at least 45% of the length of the bed, preferably at least 50%, more preferably at least 60%, and has reached at most 80% of the length of the bed, preferably at most 70%, calculated from the end of the bed at which the gas mixture is being fed. In a preferred embodiment, the feeding and discharging is ceased when the adsorption capacity of the adsorbent bed towards carbon monoxide is reduced by 50% to 80%, preferably 60% to 70% from its adsorption capacity towards carbon monoxide when commencing the feeding of the effluent.

The progress of a carbon monoxide comprising gas through the bed can be monitored, e.g. by analyzing gas samples of the second effluent and/or gas samples from the column and adsorbent bed. The progress of a carbon monoxide comprising gas through the bed may additionally or alternatively be monitored by determining the temperature along the length of the bed, e.g. by using thermocouples placed along the length of the bed. At the front of the carbon monoxide comprising gas the temperature is increased as compared to the part of the bed that has not yet been reached by the carbon monoxide comprising gas. At the front of the carbon monoxide comprising gas the temperature is also increased as compared to the part of the bed where carbon monoxide has already been adsorbed.

In one embodiment of the method of the present invention, an optionally scrubbed Fischer-Tropsch off-gas or an optionally scrubbed syngas are used as the gas mixture in step (1), and at least a part of the fourth effluent is sent as a feed or recycle stream to a syngas manufacturing unit. The syngas manufacturing facility is preferably part of a Fischer-Tropsch line-up or a gas to methanol line-up or other line-up in which syngas is produced or used.

In an embodiment, an optionally scrubbed Fischer-Tropsch off-gas from a first Fischer-Tropsch reactor is used in step (1), and at least a part of the effluent of step (3) is sent as a feed stream to a second Fischer-Tropsch reactor.

In an embodiment at least a part of the effluent of step (3) (second effluent) is sent as a recycle stream to the Fischer-Tropsch reactor that produces off-gas, and at least a part of the effluent of step (3) is sent as a feed stream to a second Fischer-Tropsch reactor.

In step (4), ceasing the feeding of the effluent, is performed by stopping the flow of gas to the column comprising an adsorbent bed. When the feeding and discharging is stopped, some hydrogen, nitrogen and/or argon will remain in the column containing an adsorbent bed. Upon ceasing the feeding of the effluent, the pressure in the column and adsorbent bed is reduced by about 5 to 25 bar a. The pressure reduction in the column and adsorbent bed suffices to let most of the effluent, which comprises hydrogen, nitrogen and/or argon leave at the same end from which the second effluent was discharged in step (3).

In an embodiment of the present invention the method comprises between steps (4) and (5) the following steps:
  rinsing the column and the adsorbent bed by feeding a carbon rich gas stream, preferably treated natural gas and/or the fourth effluent, comprising methane and optionally carbon dioxide through the column and adsorbent bed,
  the column and bed being at a pressure in the range of 5 to 75 bar a, preferably 25 to 65 bar a, more preferably 30 to 55 bar a, and
  discharging a fifth effluent from the other end of said bed, and
  continuing said feeding and said discharging until at least 60% of the inerts such as nitrogen and/or argon that were present in the bed at the commencement of this rinsing step are discharged from the other end of said bed.

In an embodiment, at least a part of the fourth effluent is sent as feed to a synthesis gas manufacturing unit and preferably as part of a Fischer-Tropsch line-up or a methanol line-up, or wherein steps (A) to (E) are performed and at least a part of the fourth effluent is sent as feed or as recycle to a synthesis gas manufacturing unit as part of a Fischer-Tropsch line-up or a methanol line-up, and/or at least a part of the discharged effluent of step (A) is sent, separately as a feed to a Fischer-Tropsch reaction, methanol line-up or other processing unit(s).

In an embodiment of the present invention a carbon rich stream is fed to the column comprising an adsorbent bed. The gas is fed to the same end of the bed at which the effluent of step (1) and/or (2), was fed in step (3).

The term inerts is used to indicate compounds which are not chemically reactive. For the present invention the inerts include nitrogen and argon.

The carbon rich stream, may, for example, be pure methane, a mixture comprising methane and/or carbon monoxide and/or carbon dioxide and/or treated natural gas. Treated natural gas is natural gas from which contaminants like water and sulfur have been removed. The treated gas comprising at least 70 vol % methane, preferably at least 90 vol % methane, may, for example, have the same composition as the hydrocarbonaceous feed that is converted into syngas.

The carbon rich gas may be or may comprise the fourth effluent of step (5). Hence, the bed and column may be fed with a methane and optionally carbon dioxide comprising gas from step (5) of an earlier cycle. In that case the product methane and optionally carbon dioxide comprising gas from step (5) of an earlier cycle may be pressurized before it is used as feeding gas in this other embodiment, but this may not be necessary as the product gas from step (5) may be at a sufficiently high pressure when it leaves the column.

In an embodiment of the present invention, between steps (4) and (5) a gas comprising at least 95 vol % carbon dioxide preferably a gas comprising at least 99 vol % carbon dioxide is fed to the column comprising an adsorbent bed. The gas comprising at least 95 vol % carbon dioxide may be obtained from a place where carbon dioxide is stored, for example at a carbon capture and storage (CCS) site. In an embodiment of the process the gas comprising at least 95 vol % carbon dioxide may be obtained from a CO2 recovery step upstream of the Pressure Swing Adsorption unit. Additionally or alternatively, the gas comprising at least 95 vol % carbon dioxide fed to the column may be all or a part of the effluent of step (6) of an earlier cycle. In that case the effluent of step (6) may be pressurized before it is used as rinse gas in this embodiment.

While rinsing, a fifth effluent is discharged from the other end of the adsorbent bed. The adsorbent bed will adsorb even more methane while a methane comprising gas is fed or even more carbon dioxide while a carbon dioxide comprising gas is fed. The fifth effluent will comprise of inerts such as nitrogen and/or argon but also carbon monoxide. Preferably the effluent comprises at least 50 vol %, preferably at least 80 vol %, more preferably at least 90 vol %, even more preferably at least 95 vol %, still more preferably at least 99 vol % nitrogen, carbon monoxide and/or argon, calculated on the total volume of the effluent. The pressure of the effluent gas will be about the same as the pressure in the column and the adsorbent bed and will thus be in the range of 5 to 75 bar absolute (bar a), preferably 25 to 65 bar a, more preferably 30 to 55 bar a. The nitrogen, argon and carbon monoxide product stream can be used as low calorific fuel gas.

The feeding of a carbon rich gas such as a carbon rich or carbon dioxide containing gas, and the discharging of the fifth effluent are continued until at least 60%, preferably at least 70%, more preferably at least 80%, even more preferably at least 90%, still more preferably at least 95% of the inerts, such as nitrogen and/or argon, that was present in the adsorbent bed at the commencement of this rinsing step is discharged from the other end of the bed. The methane and/or carbon dioxide in the feed will replace the inerts in the adsorbent bed. In one embodiment, methane and/or carbon dioxide is fed to the column and the feeding and discharging is ceased when a breakthrough of methane and/or carbon dioxide is imminent. In this embodiment, methane and/or carbon dioxide is thus fed until the adsorption capacity of the adsorbent bed towards methane and/or carbon dioxide is nil or almost nothing.

The progress of a carbon rich gas through the bed can be monitored, e.g. by analyzing gas samples of the fifth effluent and/or gas samples from the column and adsorbent bed. The progress of a methane and/or carbon dioxide comprising gas through the bed may additionally or alternatively be monitored by determining the temperature along the length of the bed, e.g. by using thermocouples placed along the length of the bed. At the front of the methane and/or carbon dioxide comprising gas the temperature is increased as compared to the part of the bed that has not yet been reached by the methane and/or carbon dioxide comprising gas. At the front of the methane comprising gas the temperature is also increased as compared to the part of the bed where the methane and/or carbon dioxide has already replaced the inerts in the adsorbent bed.

The feeding of a carbon rich gas stream or a gas comprising at least 95 vol % carbon dioxide and the discharging of the fifth effluent are continued until a specific composition limit is reached and is discharged from the other end of said bed. The aim of this is to recover the inerts such as nitrogen and/or argon that were present in the effluent fed to step (3).

The velocity of the feed may be relatively low. The rinse to feed ratio for this embodiment may, for example be about 0.01 to 0.5.

One way to control the amount of nitrogen and/or argon in the fifth effluent obtained in this embodiment is to determine the amount of nitrogen and/or argon in the effluent fed to step (3) and to determine the amount of nitrogen and/or argon that is discharged as fifth effluent. The feeding and discharging are continued until a pre-determined specific amount of the nitrogen and/or argon that was present at the commencement of this rinsing step is discharged from the other end of said bed. Such specific amount will be based on the requirement of the technology used within the Fischer-Tropsch process.

In step (5), the feeding of a carbon rich gas stream or a gas comprising carbon dioxide is ceased. The pressure of the column and adsorbent bed is reduced to a pressure in the range of 5 to 25 bar a. During step (5) a mixture of methane, carbon dioxide and optionally carbon monoxide leaves the column and bed at the same end at which an effluent was fed in step (3).

The gas comprising methane, carbon dioxide, and optionally carbon monoxide, discharged in step (5), can be obtained at intermediate pressure. When the gas comprising methane, carbon dioxide and optionally carbon monoxide is recovered at an intermediate pressure it can be fed to a gasifier or a reformer, for example an auto thermal reformer, without performing a pressurization step. The gasifier or reformer can be part of a syngas producing line-up, for example in a Fischer-Tropsch line-up or a gas to methanol line-up.

In case the process according to the present invention is applied in a Fischer-Tropsch line-up, the process makes it possible to convert most of the carbon atoms of the hydrocarbonaceous feed stock to the desired $C_5+$ hydrocarbons.

The effluent discharged in step (5) may be fed to a gasifier or ATR. The gasification may be carried out by partially oxidizing, for example according to the Shell Gasification Process (SGP) by partial oxidation using pure oxygen. The partial oxidation using pure oxygen may be operated at 1100 to 1700° C. Preferably the partial oxidation using pure oxygen is operated at 1300 to 1500° C. and pressures up to 70 bar. The gasification may be carried out by partial oxidation as described in WO9603345A1 using a co-annular burner using 99.5% pure oxygen and optionally carbon dioxide as moderator gas and in the absence of a catalyst. A further example is described in WO2008006787A2. In the process of WO2008006787A2 partial oxidation on a methane comprising feed is performed using a multi-orifice burner provided with an arrangement of separate passages, wherein the gaseous hydrocarbon having at elevated temperature flows through a passage of the burner, an oxidiser gas flows through a separate passage of the burner and wherein the passage for gaseous hydrocarbon feed and the passage for oxidiser gas are separated by a passage through which a secondary gas flows, wherein the secondary gas comprises hydrogen, carbon monoxide and/or a hydrocarbon.

The effluent discharged in step (5) may be fed to a reformer. The reforming may be carried out using a reforming process, preferably using a steam reforming process. More preferably a steam methane reforming process (SMR), an adiabatic steam reforming process (ASR), a fired steam reforming process, or an auto thermal steam reforming process (ATR) is used or a combination thereof. Most preferably an auto thermal steam reforming process (ATR) is used. Even more preferably an ATR process is used in which gas heated reforming (GHR) is incorporated. The ATR and the GHR can be linked in different ways; the configuration in which feed gas passes through the GHR and ATR in series is preferred. Hence, the effluent discharged in step (5) most preferably is fed to an ATR, even more preferably to a GHR and ATR which are placed in series.

In one embodiment of the method of the present invention, at least part of the effluent of step (5) is sent as a recycle stream to a gasifier or as a high calorific fuel gas.

In another embodiment of the method of the present invention, at least part of the effluent of step (5) is sent as a recycle stream to a reformer or an SMR or an ASR or an ATR or a GHR and ATR or an SMR and ATR placed in series or as high calorific fuel gas.

In one embodiment where a rinse step is performed between steps (4) and (5), the effluent of step (5) can be used as part or all of the rinse gas.

In step (6), the pressure of the column and adsorbent bed is further reduced to a pressure in the range of 1 to 5 bar a. During step (6) a mixture of methane, carbon dioxide and other remaining carbon containing compounds leaves the column and bed at the same end at which in step (3) the effluent was fed to the column and bed. This mixture may be sent to a fuel gas pool.

In step (7), the column and adsorbent bed are rinsed by feeding a mixture of hydrogen, nitrogen and/or argon through the column and adsorbent bed. The mixture of hydrogen, nitrogen and/or argon is fed to the same end of the column and bed from which the second effluent was discharged in step (3). During step (7) residual methane, carbon dioxide and other carbon containing compounds leave the column and bed at the same end at which in step (3) the effluent was fed to the column and bed.

In a preferred embodiment, the mixture of hydrogen, nitrogen and/or argon used in step (7) is a part of the second effluent from step (3), and may optionally also comprise a part of the effluent from step (4).

In a preferred embodiment, the mixture of hydrogen, nitrogen and/or argon used in step (7) is a part of the effluent from step (C) and/or step (D).

In a preferred embodiment, the mixture of hydrogen, nitrogen and/or argon used in step (7) is a part of the effluent from step (4) and a part of the effluent from step (C) and/or step (D). It may optionally also comprise part of the effluent from step (3), also called second effluent.

The gas stream fed to the column and bed rinses the bed from methane, carbon dioxide and other carbon containing compounds. The pressure of the effluent gas will be about the same as the pressure in the column and the adsorbent bed and will thus be in the range of 1 to 5 bar a. The effluent can be sent to a fuel pool.

In a preferred embodiment, the column and adsorbent bed are rinsed in step (7) by feeding a mixture of hydrogen, nitrogen and/or argon through the column and adsorbent bed, whereby the column and bed are at a pressure in the range of 1 to 5 bar a. A gas comprising at least 80 vol % nitrogen, preferably at least 95 vol % nitrogen, may be the product of an air separation unit (ASU). The mixture of hydrogen, nitrogen and/or argon preferably is a part of the effluent from step (4) and/or steps (C) and (D), and may optionally also comprise a part of the second effluent from step (3). The gas comprising at least 80 vol % nitrogen and/or argon, and/or a mixture of hydrogen, nitrogen and/or argon, are fed to the same end of the column and bed from which the second effluent was discharged in step (3). A part of the residual methane, carbon dioxide and other carbon containing compounds leave the column and bed at the same end at which in step (3) the effluent was fed to the column and bed. This stream can be sent to a fuel pool.

In step (8) the column and adsorbent bed are pressurized to a pressure in the range of 15 to 75 bar a, preferably 25 to 65 bar a, more preferably 30 to 55 bar a by feeding a mixture of hydrogen, nitrogen and/or argon. The mixture used may comprise a part of the product hydrogen, nitrogen and/or argon from step (3), and may optionally also comprise a part of the product hydrogen, nitrogen and/or argon from step (4). The mixture of hydrogen, nitrogen and/or argon preferably comprises hydrogen in a range of between 60 to 95 vol %, and nitrogen and/or argon in a range of between 5 to 40 vol %. The mixture of hydrogen, nitrogen and/or argon preferably comprises less than 10 vol %, more preferably less than 5 vol %, even more preferably less than 1 vol % of gases other than hydrogen, nitrogen and/or argon.

In an embodiment of the present invention the method further comprises, in sequence, the following step:

(A) feeding all or a part of the second effluent through a column comprising an adsorbent bed, the adsorbent bed comprising alumina, a carbon molecular sieve, silicalite, activated carbon, a zeolite, or mixtures thereof,
  with upon commencement of said feeding, the bed and column being pre-saturated and pre-pressurized to a pressure in the range of 20 to 80 bar absolute (bar a), preferably 30 to 70 bar a, with a gas preferably comprising 80 to 99.9 volume % hydrogen, and
  discharging a third effluent from the other end of said bed, and
  continuing said feeding and said discharging until a nitrogen and/or argon comprising gas has reached at least 45% of the length of the bed and has reached at most 80% of the length of the bed, calculated from the end of the bed at which the second effluent is being fed; and (B) ceasing the feeding of the second effluent, and reducing the pressure in the column and the bed by about 2 to 25 bar a; and (C) further reducing the pressure of the column and adsorbent bed to a pressure in the range of 1 to 5 bar a; and (D) rinsing the column and adsorbent bed by feeding a gas, preferably comprising 80 to 99.9 volume % hydrogen, through the column and adsorbent bed
  the column and bed being at a pressure in the range of 1 to 5 bar a, and (E) pressurizing the column and adsorbent bed to a pressure in the range of 15 to 75 bar a, preferably 25 to 65 bar a, more preferably 30 to 55 bar a by feeding a gas, preferably comprising 80 to 99.9 volume % hydrogen.

In a preferred embodiment, steps (A) to (E) are performed. In this preferred embodiment, a gas comprising at least 80 vol % hydrogen, calculated on the total volume of this hydrogen comprising gas, is produced. The gas preferably comprising at least 80 vol % hydrogen is obtained in steps (A) and (B).

The gas comprising at least 80 vol % hydrogen may be recycled to a Fischer-Tropsch reactor or other processing units such as a methanol facility.

As described above, steps (3) to (8) may be performed using a single column comprising an adsorbent bed. As described above, preferably repeated cycles of steps (3) to (8) are performed. Preferably at least two, preferably at least six, columns that comprise an adsorbent bed are used for steps (3) to (8). Preferably the columns for steps (3) to (8) are connected in parallel.

In a preferred embodiment of the present invention repeated cycles of steps (A) to (E) are performed. Effluent from one step can be used as feeding gas in another step; this is especially advantageous when repeated cycles of steps (A) to (E) are performed.

Steps (A) to (E) may be performed using a single column comprising an adsorbent bed. Preferably several columns that comprise an adsorbent bed are used. When using more than one column, the columns are preferably connected in parallel. Preferably the repeated cycles of steps (A) to (E) are performed over each column. In a preferred embodiment at least one column is subjected to one step of the cycle while another column is subjected to another step of the cycle. The product of one column can be used in another column, for example for purge, pressurization or rinse. In one embodiment at least two columns comprising an adsorbent bed, preferably at least five columns comprising an adsorbent bed, are subjected to repeated cycles of steps (A) to (E). Preferably at most 20, more preferably at most 15, columns comprising an adsorbent bed are subjected to repeated cycles of steps (A) to (E).

Preferably at least two, preferably at least six, columns that comprise an adsorbent bed are used for steps (3) to (8) and at least two, preferably at least five, columns that comprise an adsorbent bed are used for steps (A) to (E).

Preferably, one column or one set of columns is used for steps (3) to (8) and another column or another set of columns is used for steps (A) to (E).

Preferably the columns for steps (3) to (8) are connected in parallel, and the columns for steps (A) to (E) are connected in parallel.

In case steps (3) to (8) and steps (A) to (E) are performed, preferably use is made of two different pressure swing adsorption units (PSA units); one PSA for steps (3) to (8), and one PSA for steps (A) to (E). Effluents from steps (A) to (E) could be used to rinse or pressurize a column or set of columns in steps (3) to (8).

The feed gas for step (A) is at least a part of the second effluent of step (3).

The feed gas for step (A) preferably comprises 10 to 40 volume % nitrogen and/or argon and 60 to 90 volume % hydrogen. More preferably the feed gas for step (A) comprises 15 to 35 volume % nitrogen and/or argon and 65 to 85 volume % hydrogen.

For steps (A) to (E), the column comprising an adsorbent bed may be made of metal, preferably stainless steel. The adsorbent bed for steps (A) to (E) comprises alumina, a carbon molecular sieve, silicalite, activated carbon, a zeolite, or mixtures thereof. Preferably the adsorbent bed comprises a zeolite. When alumina is used, it is combined with a zeolite. The zeolite may for example be ZSM-5A and/or ZSM-13 X and/or a LiX zeolite. Zeolite is a preferential adsorber for nitrogen as compared to hydrogen.

The absorbent bed and column are already pre-saturated and pre-pressurized with hydrogen upon commencement of feeding the effluent of step (3) in step (A). The bed and column may be saturated and pressurized with pure hydrogen. Pure hydrogen comprises more than 80 volume %, preferably more than 95 vol %, and more preferably more than 99.9 vol % of hydrogen. The bed and column may be saturated and pressurized with a product hydrogen comprising gas from step (A) of an earlier cycle.

In step (A), a third effluent is discharged from the other end of the adsorbent bed. The adsorbent bed will adsorb nitrogen and/or argon. The third effluent will mainly comprise hydrogen. A part of this third effluent can be used to pressurize a column and absorbent bed at the start of a cycle or in step (E). Another part can be sent as feed to a Fischer-Tropsch reaction, methanol production facility or other processing units. The pressure of the third effluent gas will be about the same as the pressure in the column and the adsorbent bed and will thus be in the range of 20 to 80 bar absolute (bar a), preferably 30 to 70 bar a.

In step (A), the feeding of the second effluent and the discharging of the third effluent are continued until a front of nitrogen and/or argon comprising gas has reached at least 45% of the length of the bed, preferably at least 50%, more preferably at least 60%, and has reached at most 80% of the length of the bed, preferably at most 70%, calculated from the end of the bed at which the second effluent is being fed. In a preferred embodiment, the feeding and discharging is ceased when the adsorption capacity of the adsorbent bed towards nitrogen and/or argon is reduced by 50% to 80%, preferably 60% to 70% from its adsorption capacity towards nitrogen and/or argon when commencing the feeding of the second effluent. The progress of a nitrogen and/or argon comprising gas through the bed can be monitored, e.g. by analyzing gas samples of the third effluent and/or gas samples from the column and adsorbent bed. The progress of a nitrogen and/or argon comprising gas through the bed may additionally or alternatively be monitored by determining the temperature along the length of the bed, e.g. by using thermocouples placed along the length of the bed. At the front of the nitrogen and/or argon comprising gas the temperature is increased as compared to the part of the bed that has not yet been reached by the nitrogen and/or argon comprising gas. At the front of the nitrogen and/or argon comprising gas the temperature is also increased as compared to the part of the bed where nitrogen and/or argon has already been adsorbed.

In step (B), ceasing the feeding of the second effluent is performed by stopping the flow of gas to the column comprising an adsorbent bed. When the feeding and discharging is stopped, some hydrogen, nitrogen and/or argon will remain in the column containing an adsorbent bed. Upon ceasing the feeding of the second effluent, the pressure in the column and adsorbent bed is preferably reduced by in total about 2 to 25 bar a. The pressure reduction in the column and adsorbent bed suffices to let most of the effluent, which comprises hydrogen, leave. During step (B) the effluent leaves the column and bed at the same end from which third effluent was discharged in step (A).

In step (C), the pressure of the column and adsorbent bed is reduced to a pressure in the range of 1 to 5 bar a. During step (C) hydrogen, nitrogen and/or argon leave the column and bed at the same end at which in step (A) the second effluent of step (3) was fed to the column and bed. The effluent can be sent to a fuel pool. Additionally or alternatively at least a part of the effluent of step (C) can be used as a feeding gas in step (7).

During step (C) almost all hydrogen, nitrogen and/or argon leave the column and bed.

In step (D), the column and adsorbent bed are rinsed by feeding hydrogen through the column and adsorbent bed. The hydrogen is fed to the same end of the column and bed from which third effluent was discharged in step (A). During step (D) residual nitrogen and/or argon leaves the column and bed at the same end at which in step (A) the second effluent from step (3) was fed to the column and bed.

In a preferred embodiment, the hydrogen used in step (D) is a part of the effluent from step (B), and may optionally also comprise a part of the third effluent from step (A).

Optionally, in step (D) the column is first rinsed with effluent from step (B) before it is rinsed by feeding a gas comprising more than 80 volume % hydrogen, preferably a gas comprising more than 95 volume % hydrogen and more preferably more than 99.9 volume % hydrogen, through the column and adsorbent bed.

The hydrogen fed to the column and bed in step (D) rinses the bed from nitrogen and/or argon. The pressure of the effluent gas will be about the same as the pressure in the column and the adsorbent bed and will thus be in the range of 1 to 5 bar a. The effluent can be sent to a fuel pool. Additionally or alternatively at least a part of the effluent of step (D) can be used as a feeding gas in step (7).

In step (E) the column and adsorbent bed are pressurized to a pressure in the range of 15 to 75 bar a, preferably 25 to 65 bar a, more preferably 30 to 55 bar a by feeding hydrogen. In step (E), the hydrogen preferably is a part of the product hydrogen from step (A).

The hydrogen fed to the column in steps (D) and (E) preferably is pure hydrogen. The hydrogen fed to the column in steps (D) and (E) preferably is a gas comprising more than 80 volume % hydrogen, more preferably a gas comprising more than 95 volume % hydrogen and more preferably more than 99.9 volume % hydrogen. Rinsing step (D) may be performed with product hydrogen comprising gas of steps (A) or (B).

Some embodiments of the method according to the invention will be illustrated below with reference to the attached figures. It is noted that the present invention should not be considered limited thereto or thereby.

FIG. 1 illustrates an overview of the process steps of a preferred method according to the invention. One column comprising an adsorbent bed is depicted six times; each time it shows a step of steps (3) to (8) according to the invention. Another column comprising an adsorbent bed is depicted five times; each time it shows a step of steps (A) to (E) according to the invention. In step (3) the effluent obtained from step (1) and/or (2) is fed to the column and bed and a mixture of hydrogen, nitrogen and/or argon is discharged.

During step (3) the pressure in the column and bed is high. In step (4) the pressure is reduced by 5 to 25 bar a, and a remainder of hydrogen, nitrogen and/or argon is discharged. In an optional step (not depicted) the column and bed are rinsed by feeding them with 95 vol % carbon dioxide or treated natural gas and/or the effluent of step (5) of an earlier cycle and discharging inerts such as nitrogen and/or argon. The inerts stream can be sent to a fuel pool. In step (5) the pressure in the column and bed is reduced to 5 to 25 bar a, and a mixture of methane, optionally carbon dioxide and optionally other carbon containing compounds such as carbon monoxide is discharged. In step (6) the pressure in the column and bed is further reduced to 1 to 5 bar a, and a mixture of methane, carbon dioxide and other hydrocarbons is discharged. This mixture may be sent to a fuel pool. In step (7) a mixture of hydrogen, nitrogen and/or argon is fed to the column and bed and the effluent may be sent to the fuel pool. In step (8) the column and bed are pressurized to a high pressure again using a mixture of hydrogen, nitrogen and/or argon.

During step (A) the pressure in the column and bed is high. A pure hydrogen product having a hydrogen content of at least 80 vol %, preferably 95 vol % or more preferably 99.9 vol % will be discharged. In step (B) the pressure is reduced in total by 2 to 25 bar a, and a remainder of hydrogen is discharged. In step (C) the pressure in the column and bed is reduced to 1 to 5 bar a, and hydrogen, nitrogen and/or argon are discharged. In step (D) hydrogen is fed to the column and bed and the effluent may be sent to the fuel pool. In step (E) the column and bed is pressurized to a high pressure again using hydrogen and optionally nitrogen and/or argon.

In an embodiment of the present invention part of an effluent obtained in step (4) is used as feeding gas in step (7), or wherein and steps (A) to (E) are performed and a part of the effluent obtained in step (4) is used as feeding gas in step (7), and at least a part of the discharged effluent of step (C) and/or of step (D) is used, separately or in combination with at least part of the effluent obtained in step (4), as a feeding gas in step (7).

In an embodiment the effluent of obtained in step (4) is used as a feeding gas in step (8) and/or the effluent of step (3) is used as a feeding gas in step (8).

Figure 2:
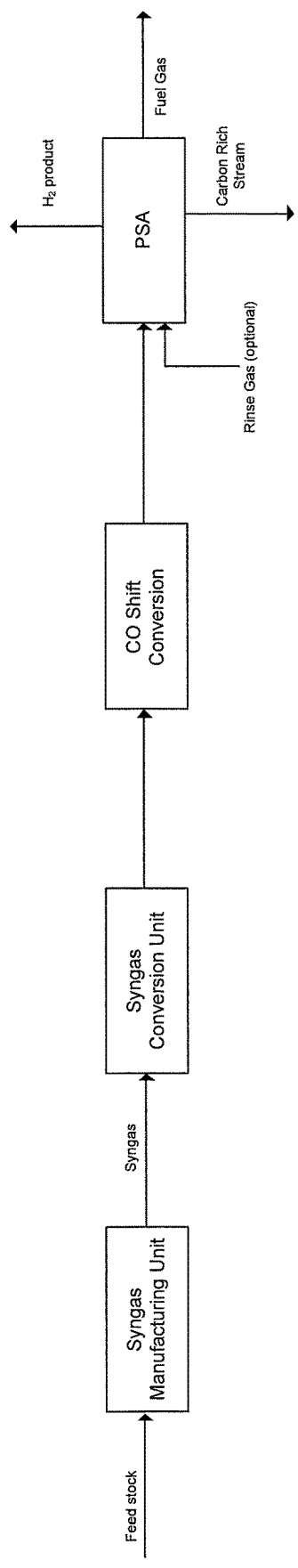
FIG. 2 shows an embodiment of a system according to the present invention.

The present invention relates to a system for recovering hydrogen, methane and optionally carbon dioxide from a gas mixture comprising methane, carbon dioxide, carbon monoxide, hydrogen, nitrogen, argon and traces of olefins and oxygenates, comprising:

one or more high, medium or low temperature shift reactor(s) or a combination thereof to convert at least part of the carbon monoxide and water into hydrogen and carbon dioxide;

a first column provided down-stream of the one or more high, medium or low temperature shift reactor(s) or a combination, comprising an adsorbent bed, wherein the adsorbent bed comprises alumina, a carbon molecular sieve, silicalite, activated carbon, a zeolite, or mixtures thereof; and optionally a second column provided down-stream of the first column, comprising an adsorbent bed, the adsorbent bed comprising alumina, a carbon molecular sieve, silicalite, activated carbon, a zeolite, or mixtures thereof. One or more of the objects defined previously are also met by the system according to the present invention. An example of this embodiment is shown in FIG. 2.

Figure 3:
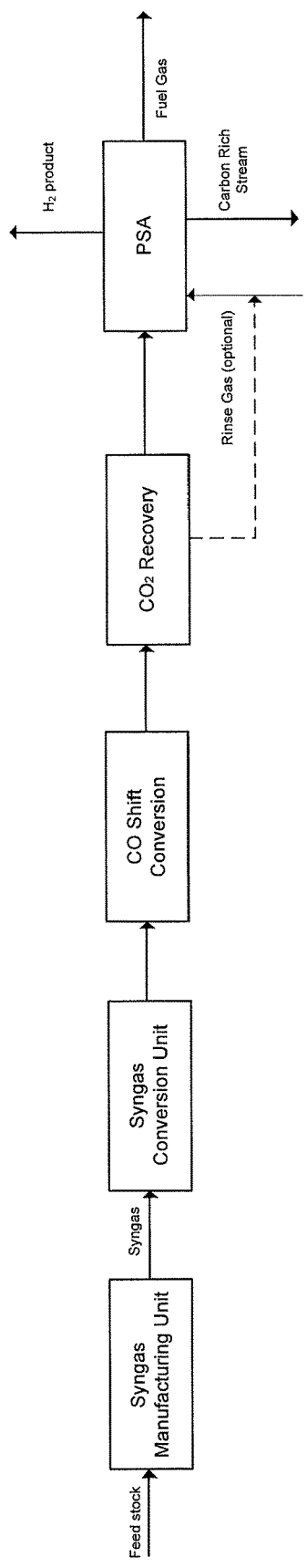
FIG. 3 shows an embodiment of a system according to the present invention.

In an embodiment the system further comprises down-stream of the one or more high, medium or low temperature shift reactor(s) or a combination thereof, a carbon dioxide recovery unit. An example of this embodiment is shown in FIG. 3.

In an embodiment the system is connected to a Fischer-Tropsch line-up or a gas to methanol line-up.

While the method has been described in terms of what are presently considered to be the most practical and preferred embodiments, it is to be understood that the disclosure need not be limited to the disclosed embodiments. It is intended to cover various modifications, combinations and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention.

It should be understood that this disclosure is intended to yield a patent covering numerous aspects of the invention both independently and as an overall system and in both method and apparatus modes.

Any patents, publications, or other references mentioned in this application for patent are hereby incorporated by reference. In addition, as to each term used, it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans.

The present invention is described by the appended claims and the subject-matter of these claims also form part of the description by way of this reference.

That which is claimed is:

1. A method for recovering hydrogen, methane and optionally carbon dioxide from a Fischer-Tropsch off-gas which is a gas mixture comprising methane, carbon dioxide, carbon monoxide, hydrogen, nitrogen, argon and traces of olefins and oxygenates, said method comprising the following steps:

(1) feeding said gas mixture and an appropriate amount of steam through a high, medium or low temperature shift reactor(s) or a combination thereof to convert at least part of the carbon monoxide and water into hydrogen and carbon dioxide, to obtain an effluent;

(2) Optionally, removing bulk water from the effluent obtained in step 1;

(3) feeding the effluent of step (1) or (2) through a column comprising an adsorbent bed, wherein the adsorbent bed comprises alumina, a carbon molecular sieve, silicalite, activated carbon, a zeolite, or mixtures thereof, with upon commencement of said feeding, the bed and column being pre-saturated and pre-pressurized to a pressure in the range of 10 to 80 bar absolute (bar a), and discharging a second effluent from the other end of said bed, and;

continuing said feeding and said discharging until a front of carbon monoxide comprising gas has reached at least 45% of the length of the bed and has reached at most 80% of the length of the bed, calculated from the end of the bed at which the effluent from step (1) and/or (2) is being fed; and (4) ceasing the feeding of the effluent from step (1) and/or (2) and reducing the pressure in the column and the bed by about 5 to 25 bar a; and (5) further reducing the pressure of the column and adsorbent bed to a pressure in the range of 5 to 25 bar a to obtain a fourth effluent;

(6) further reducing the pressure of the column and adsorbent bed to a pressure in the range of 1 to 5 bar a; and (7) rinsing the column and adsorbent bed by feeding a mixture of hydrogen, nitrogen and/or argon through the column and adsorbent bed
the column and bed being at a pressure in the range of 1 to 5 bar a; and (8) pressurizing the column and adsorbent bed to a pressure in the range of 15 to 75 bar a.

2. The method according to claim 1, further comprising, in sequence, the following step:

(A) feeding all or a part of the second effluent through a column comprising an adsorbent bed, the adsorbent bed comprising alumina, a carbon molecular sieve, silicalite, activated carbon, a zeolite, or mixtures thereof, with upon commencement of said feeding, the bed and column being pre-saturated and pre-pressurized to a pressure in the range of 20 to 80 bar absolute (bar a), and
discharging a third effluent from the other end of said bed, and
continuing said feeding and said discharging until a nitrogen and/or argon comprising gas has reached at least 45% of the length of the bed and has reached at most 80% of the length of the bed, calculated from the end of the bed at which the second effluent is being fed; and (B) ceasing the feeding of the second effluent, and reducing the pressure in the column and the bed by about 2 to 25 bar a; and (C) further reducing the pressure of the column and adsorbent bed to a pressure in the range of 1 to 5 bar a; and (D) rinsing the column and adsorbent bed by feeding a gas, through the column and adsorbent bed
the column and bed being at a pressure in the range of 1 to 5 bar a, and (E) pressurizing the column and adsorbent bed to a pressure in the range of 15 to 75 bar a.

3. The method according to claim 2, wherein repeated cycles of steps (A) to (E) are performed.

4. The method according to claim 2, wherein a part of the effluent obtained in step 4 is used as feeding gas in step (7), and at least a part of the discharged effluent of step (C) and/or of step (D) is used, separately or in combination with at least part of the effluent obtained in step 4, as a feeding gas in step (7).

5. The method according to claim 2, wherein at least two columns that comprise an adsorbent bed are used for steps (3) to (8) and at least two columns that comprise an adsorbent bed are used for steps (A) to (E).

6. The method according to claim 5, wherein the columns for steps (3) to (8) are connected in parallel, and the columns for steps (A) to (E) are connected in parallel.

7. The method according to claim 1, wherein between steps (4) and (5) the following step is performed:

rinsing the column and the adsorbent bed by feeding a carbon rich gas stream, comprising methane and optionally carbon dioxide through the column and adsorbent bed,
the column and bed being at a pressure in the range of 5 to 75 bar a, and
discharging a fifth effluent from the other end of said bed, and
continuing said feeding and said discharging until at least 60% of inerts that were present in the bed at the commencement of this rinsing step are discharged from the other end of said bed.

8. The method according to claim 7, wherein a stream comprising more than 95 vol % carbon dioxide is used as the rinsing gas in step of claim 7.

9. The method according to claim 1, wherein at least two columns that comprise an adsorbent bed are used for steps (3) to (8).

10. The method according to claim 9, wherein the columns for steps (3) to (8) are connected in parallel.

11. The method according to claim 1 wherein the gas mixture comprises:

1-50 vol % methane;
10-40 vol % carbon dioxide;
20-65 vol % carbon monoxide;
10-80 vol % hydrogen;
1-55 vol % nitrogen;
0.1-55 vol % argon;

and trace amounts of olefins and oxygenates, calculated on the total volume of the dry gas mixture.

12. The method according to claim 1 wherein the effluent comprises:

0.1-40 vol % methane;
0.1-55 vol % carbon dioxide;
0.1-40 vol % carbon monoxide;
15-95 vol % hydrogen;
0.1-55 vol % nitrogen;
0.1-55 vol % argon;

and trace amounts of olefins and oxygenates, calculated on the total volume of the dry gas mixture.

13. The method according to claim 1, wherein repeated cycles of steps (3) to (8) are performed.

14. The method according to claim 1, wherein a part of an effluent obtained in step 4 is used as feeding gas in step (7).

15. The method according to claim 1, wherein a part of the second effluent is used as feeding gas in step (8).

16. The method according to claim 1, wherein the Fischer-Tropsch off-gas is from at least one Fischer-Tropsch reactor and optionally scrubbed, and optionally an optionally scrubbed synthesis gas are used as at least part of the gas mixture in step (1) and a part of the fourth effluent is sent as a feed or recycle stream to a synthesis gas manufacturing unit natural gas to methanol line-up or other process line-up.

17. The method according to claim 1, wherein said feeding and said discharging is continued until the front of carbon monoxide has reached at most 70% of the length of the bed.

* * * * *